Dec. 14, 1926.
C. MAGGIORA
LOOKING GLASS
Filed Dec. 5, 1923
1,611,051
3 Sheets-Sheet 1
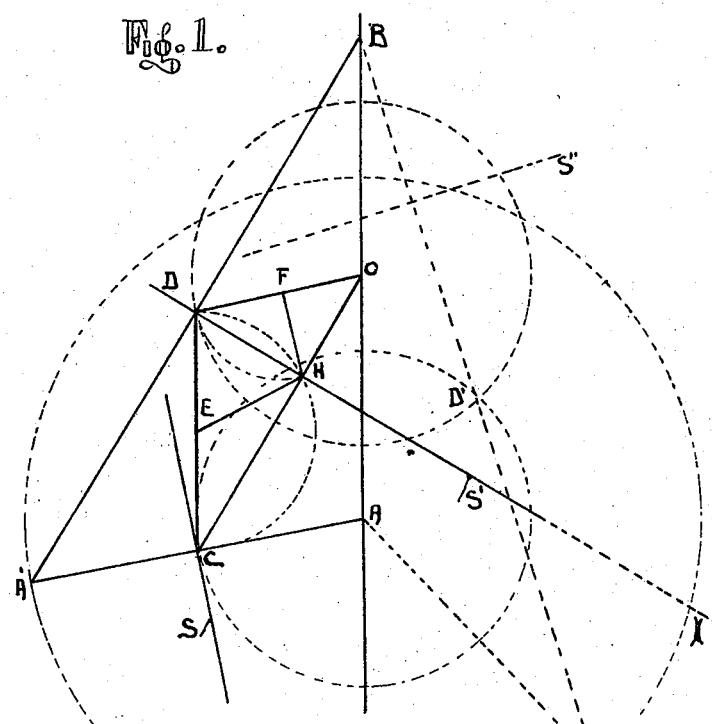
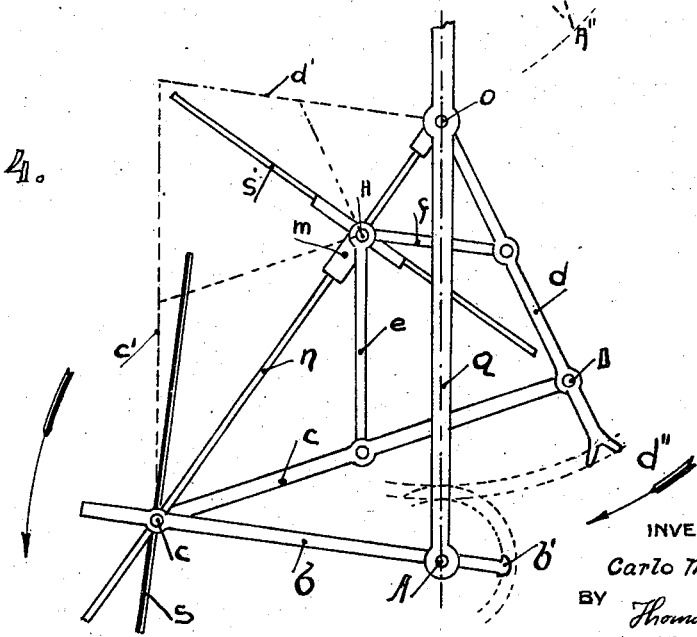
INVENTOR
Carlo Maggiora
BY Thomas A. Hill.
ATTORNEY Dec. 14, 1926.  C. MAGGIORA  1,611,051
LOOKING GLASS
Filed Dec. 5, 1923   3 Sheets-Sheet 2

INVENTOR
Carlo Maggiora
BY
Thomas A. Hill
ATTORNEY

Dec. 14, 1926.  1,611,051
C. MAGGIORA
LOOKING GLASS
Filed Dec. 5. 1923    3 Sheets-Sheet 3
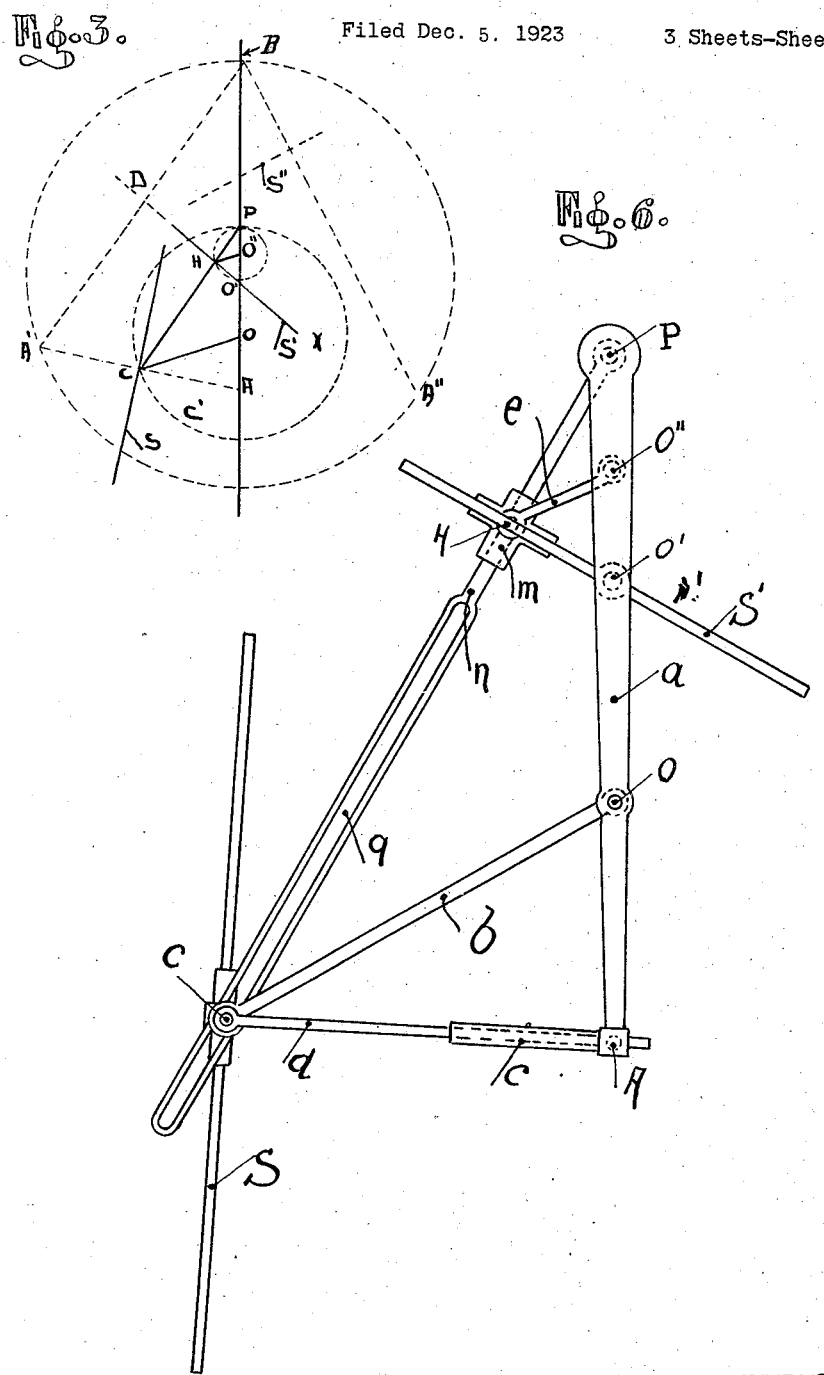
INVENTOR
Carlo Maggiora
BY
Thomas A. Hill
ATTORNEY Patented Dec. 14, 1926.

1,611,051

UNITED STATES PATENT OFFICE.

CARLO MAGGIORA, OF TORINO, ITALY.

LOOKING GLASS.

Application filed December 5, 1923, Serial No. 678,559½, and in Italy December 9, 1922.

It is already known to combine two or more mirrors in order that a person can observe himself on several sides, but the employment of detached or hinged mirrors necessitates a series of trials in a search for a particular view which as a rule cannot be obtained.

The object of this invention is to provide a mirror device whereby by moving the mirrors and by turning oneself through a certain angle, so as to cause the image to turn fully around relative to the line of sight of the observer, it is possible to regard oneself on every side.

To the attainment of this object according to the invention the device is characterized by two planes of reflection connected together mechanically so as to have a relative predetermined movement which is such that an observer at a given point in front of the mirrors can see one of his images, doubly reflected, turning around itself at a corresponding invariably imaginary point.

One advantage of the invention is that the observer does not see his image as reflected as in a simple mirror but as it is actually presented to eyes of a third person.

Figure 2:
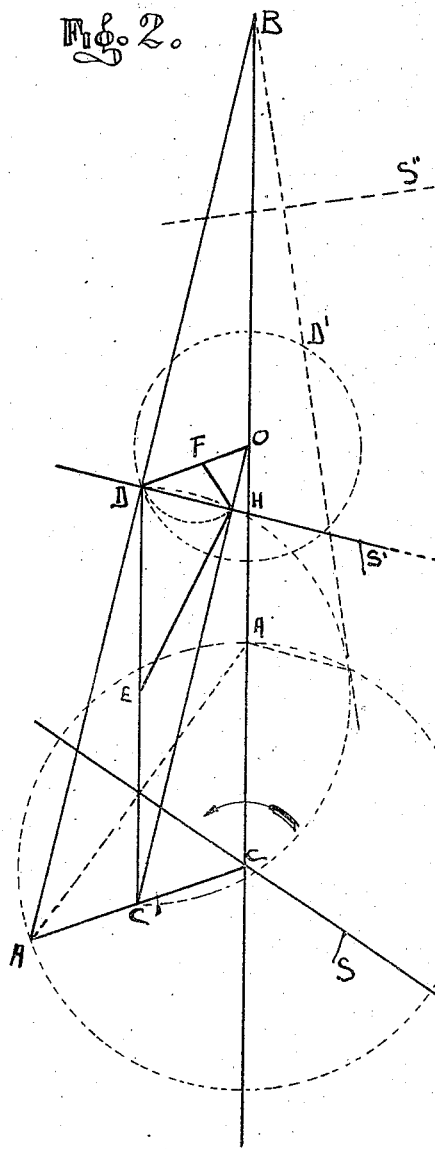
Figure 5:
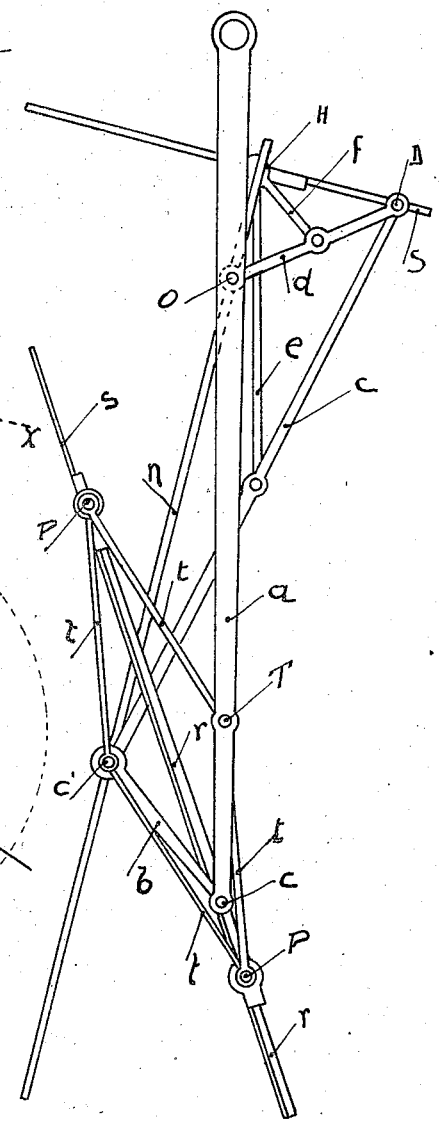

On the accompanying drawings which illustrate, by way of example, three practical embodiments of the invention, Figures 1, 2 and 3 are three diagrammatic representations thereof, showing the geometric and optical principles involved in my invention, and Figures 4, 5 and 6 are plan views of the said embodiments showing the mechanical structure incorporated therein.

In reference to Fig. 1, the point B is stationary in the rotation of the two mirrors.

A indicates the position of a person looking into a mirror S at C at right angles to the plane of the mirror and along a radius CA, so that said mirror reflects an image A' on an extension of said radius. If the mirror S moves around A, along the circumference of a circle described with radius AC whilst constantly remaining tangential to the said circumference, the image A' also describes a circle having a radius "AA'"—2AC. Assuming another mirror S' to be disposed with its plane perpendicular to the line BA' and passing through the middle point D of said line, the mirror S' gives an image of A' at B, which image is visible from A if the image S'' of the mirror S in the mirror S' intersects the line AB, since it is necessary that the vertices of the angles of reflection fall on the planes of the mirrors.

If, when the mirror S is turned around A at the distance AC, the other mirror is moved in such a manner that its plane is always at the mid-point of and perpendicular to the line BA', the image A' will be constantly reflected at B and the rotational movement of the mirror S around A is resolved into a rotational movement of the image B on itself. In order that the image B may be visible from A throughout all the rotational movement of the mirror S, it is necessary either that the dimensions of the mirrors should be suitably fixed or that the said mirrors may be displaced in their planes, so that the image S'' of the mirror S intersects the line AB.

Referring now to Fig. 2:—

If the mirror S, instead of turning around A, as in the preceding case, turns around an axis C situated in its plane, the image which it reflects from A also moves along the circumference of a circle with radius AC, and if the mirror S' is moved, as mentioned above, there is always a doubly reflected image at B which turns on itself.

Referring to Fig. 3:—

If the mirror S pivoted at C is moved around O through the circumference of a circle having a radius OC, but facing always towards A, the image A' also describes a circle with a radius O' A'=2OC. If a mirror S' is arranged at O' and is made to turn on this point so that its plane is always perpendicular to a chord BA' then, since the plane of the mirror passing through the centre of the circle is perpendicular to the chords of said circle at its middle point, the mirror will constantly reflect the image of A' at B at which point a doubly reflected image turning on itself and visible from A is obtained.

The mechanism for carrying out the relative movement of the mirrors is based on the following geometrical properties:—

It is known that the lines joining B with all the points A', (A'') on the circumference of a circle have their mid points in the circumference of a circle having a radius equal to half of that of the first mentioned circle and its centre on the mid-point of a line joining B with the centre of said first mentioned circle. All the lines drawn from the point B (Figs. 1 and 2) to the points A' (A''), have their middle points D on a circle with a radius $OD = AC = \frac{A'A}{2}$ and the triangle ODC (Fig. 1) (ODC' in Fig. 2) according to a known theorem, has its sides respectively parallel to those of triangle BAA', so that the quadrilateral AODC in Fig. 1 (CODC' in Fig. 2) is a parallelogram. The line Dx representing the direction of the plane of reflection of the mirror S' being perpendicular to BA' is also perpendicular to OC (OC' in Fig. 2) a diagonal of the said parallelogram, which it cuts at a point H the vertex of two right angled triangles DHO DHC (DHC' in Fig. 2) whose hypotenuses are the invariable sides of the parallelogram AODC in Fig. 1 and CODC' in Fig. 2 consequently the point H is also determined by the point where two semi-circles having their centres at the mid points F and E of the sides OD, DC, (DC' in Fig. 2) meet and which are drawn respectively with radii $$FH = \frac{OD}{2}, \quad EH = \frac{DC}{2} \left(EH = \frac{C'D}{2} \text{ in Fig. 2}\right).$$

In Figure 3, the point C always denotes the middle point of the line A—A' and consequently PC is parallel to BA'. Now, since the point B is on the circumference of a circle whereon A' (A'') are also points, BA' (BA'') are all chords of the same circle and the line Dx normal to the line BA' at the middle point thereof passes through the centre O' and is also normal to the line PC, parallel to the line BA'. The point H is on a semi-circle having its centre at O'' and having a radius $O'O'' = \frac{O'P}{2}$.

Having thus illustrated the geometrical functions of the planes of reflection of the two mirrors it will be easy to understand practical embodiments thereof.

An arm a fixed in the wall of a room or the wall of an article of furniture and held horizontally, by a column carries all the mechanism from which two movable mirrors S and S' are suspended, see Figs. 4, 5 and 6.

A jointed parallelogram a, b, c', d', Fig. 4, whose diagonal n is represented by a rod pivoted at Q and guided through a hole in the pivot C in which it can slide freely, reproduces mechanically the geometrical function of Fig. 1. It is understood that the chain of the parallelogram does not change if the sides c' and d' occupy the position c and d in Fig. 4, a position which is more convenient both in view of the smaller space occupied by the mechanism and in order to obtain an uninterrupted movement whatever be the relative position of the sides of the parallelogram. For this reason I prefer, hereafter, to refer to the system of rods a, b, c, d, as a "crossed parallelogram". In order to allow an easy passage of the mechanism through the position in which the sides b, c and d lie with their longitudinal axes in the same vertical plane passing through the longitudinal axis of the side a, a tooth b' is provided on an extension of the side b, said tooth engaging, when in said position, in a corresponding cavity d'' provided at the end of an extension of the side d, thus guaranteeing the continuity of the movement. The two ties e, f, respectively equal to half of c and d, are each pivoted at one extremity to the mid-point of c and d and are jointed, at their other extremities to a pivot H disposed on the rod n and fixed on a tube m movable along the rod n. The mirror S is fixed on the pivot C at right angles to the side a and the mirror S' is fixed to the tube m on the pivot H at right angles to the said tube, and consequently, also to the rod n.

The construction illustrated in Fig. 5, wherein the mirror S turns around an axis in its own plane and passing through C, whilst the object reflected is on an axis passing through A (Fig. 2) is exactly the same as the above described construction as regards the jointing of the members a, b, c, d, and the determination of the movement of the pivot H by means of ties e, f, except that in this case the guide carrying the pivot H may also slide on the extension, beyond the pivot O, of the rod n. As the mirror S turns through an angle which is half that described by the side b, the ties t, all equal to each other and conveniently longer than the side b, which is jointed at one extremity C' and is equal to the distance T to C, and at the other extremity to slides P movable on the rod r situated in the plane at S, control the turning movement of the mirror with respect to that of the side b, in such a manner that the rotation of the mirror is half of that of the said side. The point A, see Fig. 2, where the observer should be stationed is on an axis on the line CO at a distance from C equal to twice the length of the side b.

In the third case, the pivot C, (Fig. 6), supporting the mirror S, carries a rod d fixed perpendicularly to the plane of the mirror and sliding in a tube e connected to a pivot A. An arm b is pivoted at its extremities at C and O and a rod n, pivoted at P, is guided by the pivot C movable in a slot q in said rod. One of the arms of the right angled cross m is movable on n and the other arm r is situated in the same plane as a mirror S' turning around the pivot O'. The rod n is controlled by arms e and HO' (not shown) arranged beneath the mirror S' and pivoted at H, on m, and O'. The arm e is pivoted at one of its extremities at O'', the centre of length of the line PO' and, at the other extremity, at H, the length of said arm being equal to half the distance PO'. The length of the arm $b$ is equal to PO and the distance PO' is equal to PO—OA.

The above described constructional form of the invention can be simplified by eliminating the arms $e$ and HO' and by pivoting the rod $n$ at O', so that it remains itself normal to the mirror S', and by arranging at its opposite end a sleeve movably mounted on the rod $b$. When turned about O the mirror S moves along the circumference of a circle having its centre at O, but it always faces towards A and the mirror S' then turns around its pivot O' thus correctly carrying out the geometrical function illustrated in Fig. 3.

If, in the three constructional forms of the invention previously described, a person places himself in the position A, his image turns on itself, and the observer clearly sees it throughout the whole angle through which it turns (which angle is greater than the angle described by the mirror S) and if during a part of the rotation it was not eclipsed by the image of the first reflection from the mirror S'. By turning one's body and the mirrors one can see oneself throughout a complete turn.

The devices described above are capable of being modified; for example, a third fixed mirror might be arranged in order to reflect the turning image during that portion of the rotation when it is eclipsed, or two mirrors S' could be employed so as to obtain two imaginary points on which the image turns. It is immaterial if the observer is at A″ and not at A, his doubly reflected image is always at B.

Having now particularly described and ascertained the nature of my said invention and in what manner the same is to be performed, I declare that what I claim is:—

A looking glass device having two movable mirrors and a mechanism for determining the movement thereof, said mirrors being adapted to be so arranged that an observer placed at a given point can see at a corresponding imaginary point, his image in motion, said device comprising a jointed crossed parallelogram with a vertex to which a mirror is fixed so as to remain normal to an adjacent side and having a movably mounted diagonal at one apex of which is arranged said mirror and which is pivoted at its opposite apex, and a sleeve movably mounted on the said diagonal and carrying a mirror normal to the diagonal, the said sleeve being connected to two adjacent sides of the parallelogram by means of two jointed rods having a length equal to half of the length of the sides to which they are jointed.

In testimony whereof I hereunto affix my signature.

CARLO MAGGIORA.